US007145901B2

United States Patent
Tsukada et al.

(10) Patent No.: US 7,145,901 B2
(45) Date of Patent: Dec. 5, 2006

(54) METHOD OF REQUESTING SECURITY AND RELEASE OF COMMUNICATION BAND

(75) Inventors: Koji Tsukada, Tokyo (JP); Tohru Hoshi, Yokohama (JP); Keiko Tanigawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1033 days.

(21) Appl. No.: 10/143,840

(22) Filed: May 14, 2002

(65) Prior Publication Data

US 2002/0176406 A1    Nov. 28, 2002

(30) Foreign Application Priority Data

May 15, 2001    (JP)    ............................. 2001-144096

(51) Int. Cl.
*H04L 12/66*    (2006.01)
(52) U.S. Cl. ....................... 370/352; 370/351; 370/401
(58) Field of Classification Search ...................... None
See application file for complete search history.

(56) References Cited

U.S. PATENT DOCUMENTS 6,600,735 B1 *    7/2003    Iwama et al. ............... 370/352

6,643,258 B1 *    11/2003    Ise et al. .................... 370/230
6,967,958 B1 *    11/2005    Ono et al. ................... 370/401
2002/0035641 A1 *    3/2002    Kurose et al. .............. 709/241

OTHER PUBLICATIONS

"Packet-Based Multimedia Communications Systems" ITU-T Recommendation H.323, ITU Telecommunications Standardization Sector, Study Group 16, O.13-14/16 Rapporteur Meeting, DRAFT H.323v4 (Including Editorial Corrections—Feb. 2001), pp. 1-223.

* cited by examiner

*Primary Examiner*—Phirin Sam
(74) *Attorney, Agent, or Firm*—McDermott Will & Emery LLP

(57) ABSTRACT

By adopting a method of requesting a band for each plurality of calls, or a method of requesting a band independently of origination or termination of a call, a method of reducing the frequency of origination of a call is provided. A first aspect may provide that a gate keeper requests security and release of a band not every call, but collectively for a plurality of calls, and the security and the release of a band are requested at frequency less than that of origination or termination of calls. A second aspect may provide that an estimated value of a time series change in necessary band is previously set in a gate keeper, and security and release of a band required for communication are requested depending on a time, but independently of origination and termination of a call.

9 Claims, 10 Drawing Sheets

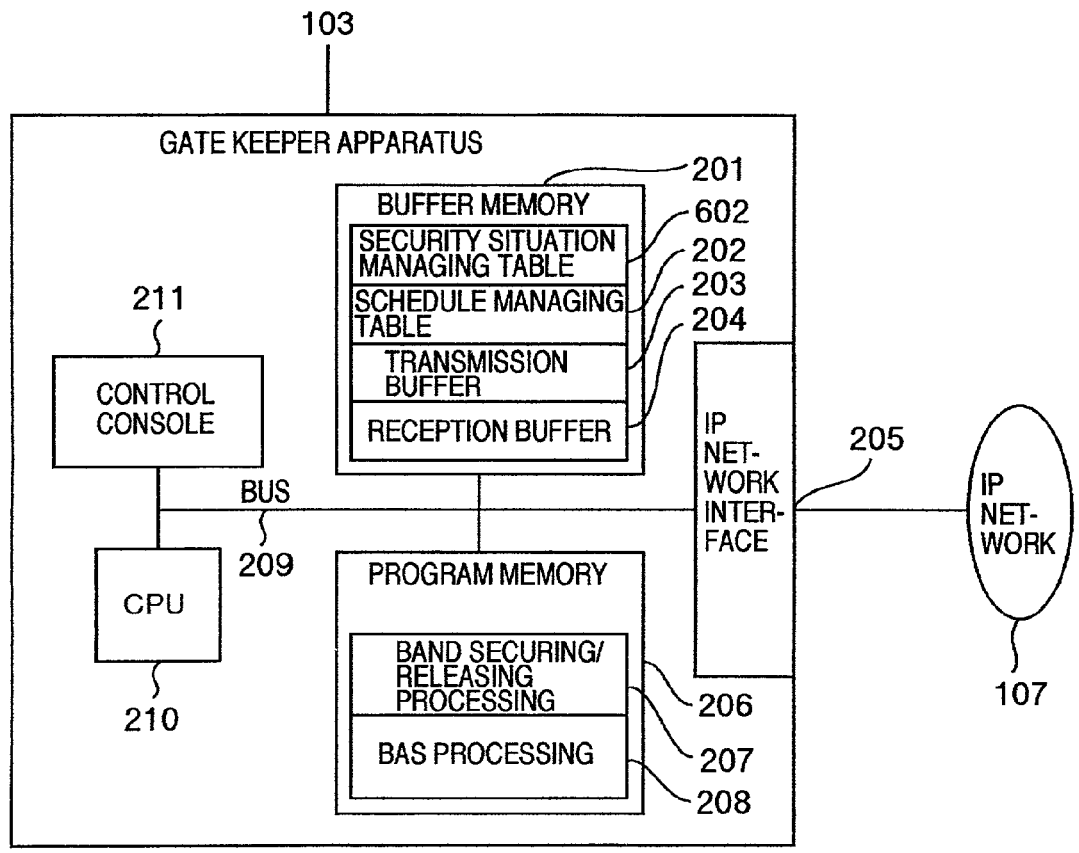

| SPECIFIED TIME | Endpoint1 | Endpoint2 | SECURITY BAND WIDTH |
|---|---|---|---|
| 06:00 | GW1 | GW2 | 2Mbps |
| 08:00 | GW1 | GW3 | 3.5Mbps |
| 09:00 | GW1 | GW2 | 3.5Mbps |
| 15:00 | GW1 | GW2 | 2Mbps |
| 18:00 | GW1 | GW2 | 1Mbps |
| 20:00 | GW1 | GW3 | 1Mbps |

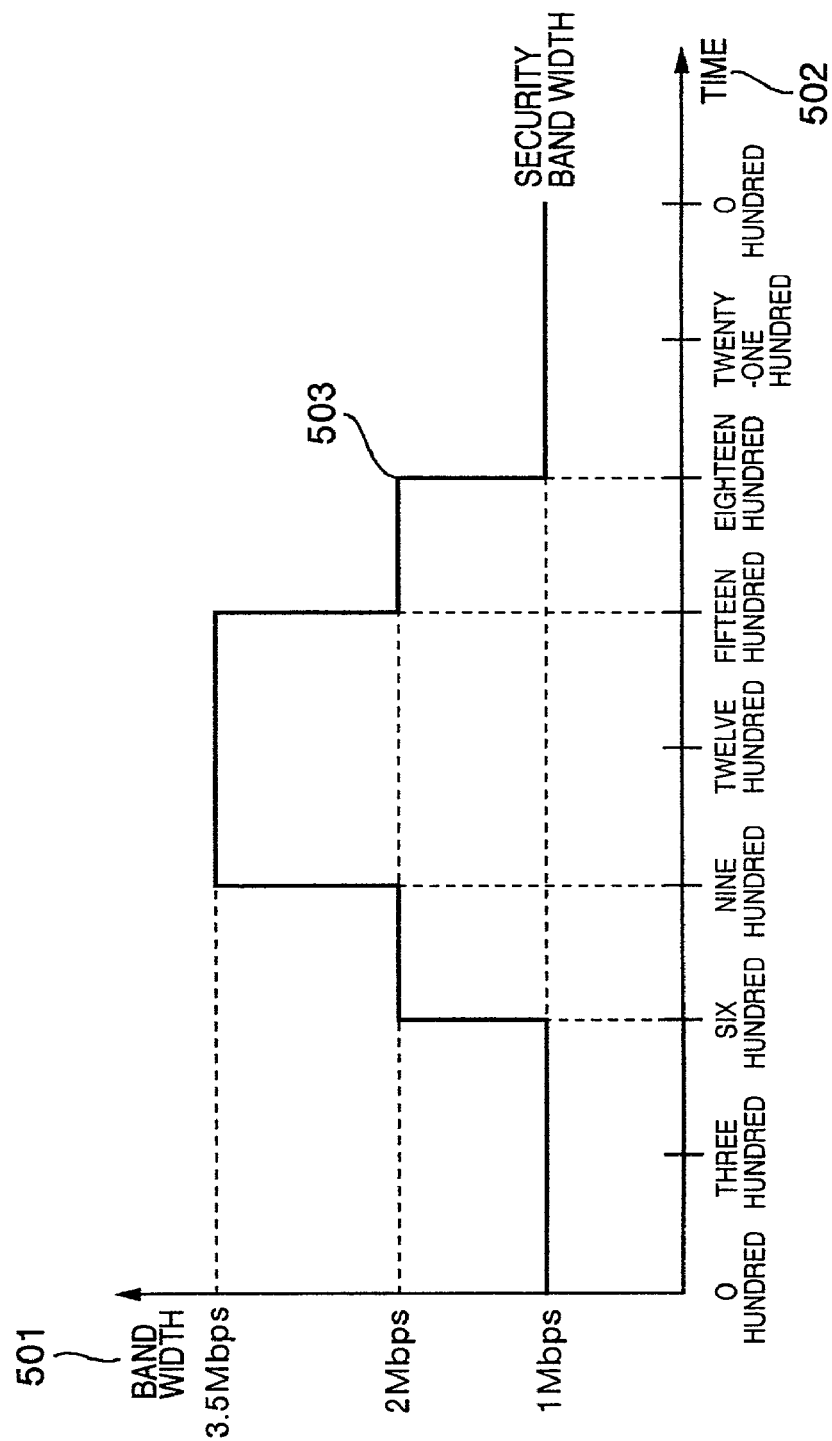

METHOD OF REQUESTING SECURITY AND RELEASE OF COMMUNICATION BAND

BACKGROUND OF THE INVENTION

1. Field of the Invention

The present invention relates to a method of when carrying out sound communication between IP telephone gateway apparatuses connected to an IP network and a telephone network, between IP telephone terminals connected to an IP terminal, or the IP telephone terminal and the IP telephone gateway apparatus, requesting a router apparatus, for which a gate keeper apparatus can secure or release a band width, to secure and release a communication band width used in the communication between the above-mentioned apparatuses.

2. Description of the Related Art

In a conventional IP telephone connection protocol, a band required for the communication was secured or released along with origination or termination of a call. For example, in ITU-T H. 323, an IP telephone gateway apparatus, in originating call connection, in a sequence of an RAS (Registration, Admission & Status) protocol, informs a gate keeper of a communication band required for a call through an ARQ message, and in termination of a call, likewise, informs the gate keeper of the release of the communication band used in a call through a DRQ message. The gate keeper which has received the request therefrom informs the router apparatus of the security or release of the communication band. Then, the gate keeper, depending on whether or not the necessary band can be secured, sends as a reply in the form of an ACF message a connection permission to an IP telephone gateway apparatus, or sends as a reply in the form of an ARJ message a connection rejection to the IP telephone gateway apparatus.

In a conventional method of securing and releasing a band, a router which can secure or release a band width is requested to secure or release the band width in accordance with a protocol such as an SNMP (RFC1157), an RSVP (RFC2205) or a COPS (RFC2748). For example, in the RSVP, router apparatuses on a communication path actually used in communication are successively informed of a request to secure a band through a path message. Then, the communication only becomes possible in the desired communication band at a time point when the setting has been completed in all of the router apparatuses on the communication path and all of the router apparatuses have received an Resv message.

The router apparatus changes the priority of the relay processing of a relay packet in accordance with the request reported thereto by the above-mentioned various kinds of methods to secure or release the band.

In accordance with the general technique in the router apparatus, a packet relay processing queue for the general relay packet processing and a queue for the priority relay packet queue are prepared in the router apparatus and the packet of the queue for the priority relay packet is preferentially processed to secure the band. In addition, a priority relay packet table used to judge the packet to be put into the queue for the priority relay packet processing is prepared in the router apparatus. When a request to secure the band including at least a transmission source address and a transmission destination address has been made, this request is registered in the above-mentioned priority relay packet table. Thereafter, when having received a packet, a pair of transmission source address and transmission destination address of the packet is compared with the contents of the above-mentioned table to judge whether or not the matching is obtained therebetween. If it is judged that the matching is obtained therebetween, then the packet of interest is added to the last of the queue for the priority relay packet processing. On the other hand, if it is judged that the matching is not obtained therebetween, the packet of interest is added to the last of the queue for the general relay packet processing. With respect to the transmission of the packet, if the queuing is present for the queue for the priority relay packet processing, then the packet in the queue is preferentially transmitted, and otherwise, the packet in the queue for the general relay packet processing is transmitted.

In the conventional combination of the IP telephone connection protocol and the method of securing and releasing a band, the security request and the release request are made with the start and end of a session corresponding to one call as a turning point. When the number of lines accommodated in the IP telephone gateway apparatus is large, if that method is adopted, then there arises the problem that a ratio of occupation of the traffic due to the communication of the security request and the release request in the network between the gate keeper apparatus and the router apparatus become large and hence the number of bands which can be used in the sound communication is reduced.

In addition, a period of time ranging from the security request up to the actual security and a period of time ranging from the release request up to the actual release are each on the order of several seconds in many cases. For this reason, if that method is applied to the environment, such as the IP telephone, in which the origination and termination of calls are frequently generated, then there arises the problem that a processing amount in the router apparatus is increased, and hence the processing for securing and releasing a band is not enough to follow the processing amount in the router. As a result, it is impossible to secure the necessary communication band until the sound signal has been started to be relaid, and hence there is the possibility that the quality of the communication ranging from the call origination up to the actual security of a band is degraded.

In addition, in a method of securing fixedly previously a band, it is possible to avoid the influence of the processing time required for the security or the release in the router and also the possibility that the communication quality in originating a call may be degraded is cancelled. However, in the IP telephones, similarly to general telephones, a call amount undergoes the daily change, the weakly change and the yearly change. Therefore, if a call amount able to cope with the busy term is secured, then the number of useless bands is increased in the free term. As a result, there arises the problem that the utilization efficiency is poor.

SUMMARY OF THE INVENTION

In the light of the foregoing, the present invention has been made in order to solve the above-mentioned problems associated with the prior art, and it is therefore an object of the present invention to provide a method of by adopting either a method of requesting a band for each plurality of calls or a method of requesting a band independently of origination or termination of a call, reducing the frequency of origination thereof.

In accordance with a first aspect, the present invention may provide that a gate keeper requests the band security and the band release not every call, but collectively for each plurality of calls, and also requests the security or the release of a necessary band at frequency lower than that of origination or termination of a call.

In accordance with a second aspect, the present invention may provide that an estimated value of a time series change of a necessary band is previously set in a gate keeper, and the security and the release of a band required for the communication are requested depending on a time, but independently of origination or termination of a call.

BRIEF DESCRIPTION OF THE DRAWINGS

FIG. 2 is a block diagram showing a configuration of a gate keeper apparatus 103;

FIG. 3 is a diagram showing table structure of a security situation managing table 602;

FIG. 12 is a diagram showing a time change in security band width according to the processing of the second embodiment.

DETAILED DESCRIPTION OF THE EMBODIMENTS

The preferred embodiments of the present invention will hereinafter be described in detail with reference to the accompanying drawings.

Figure 1:
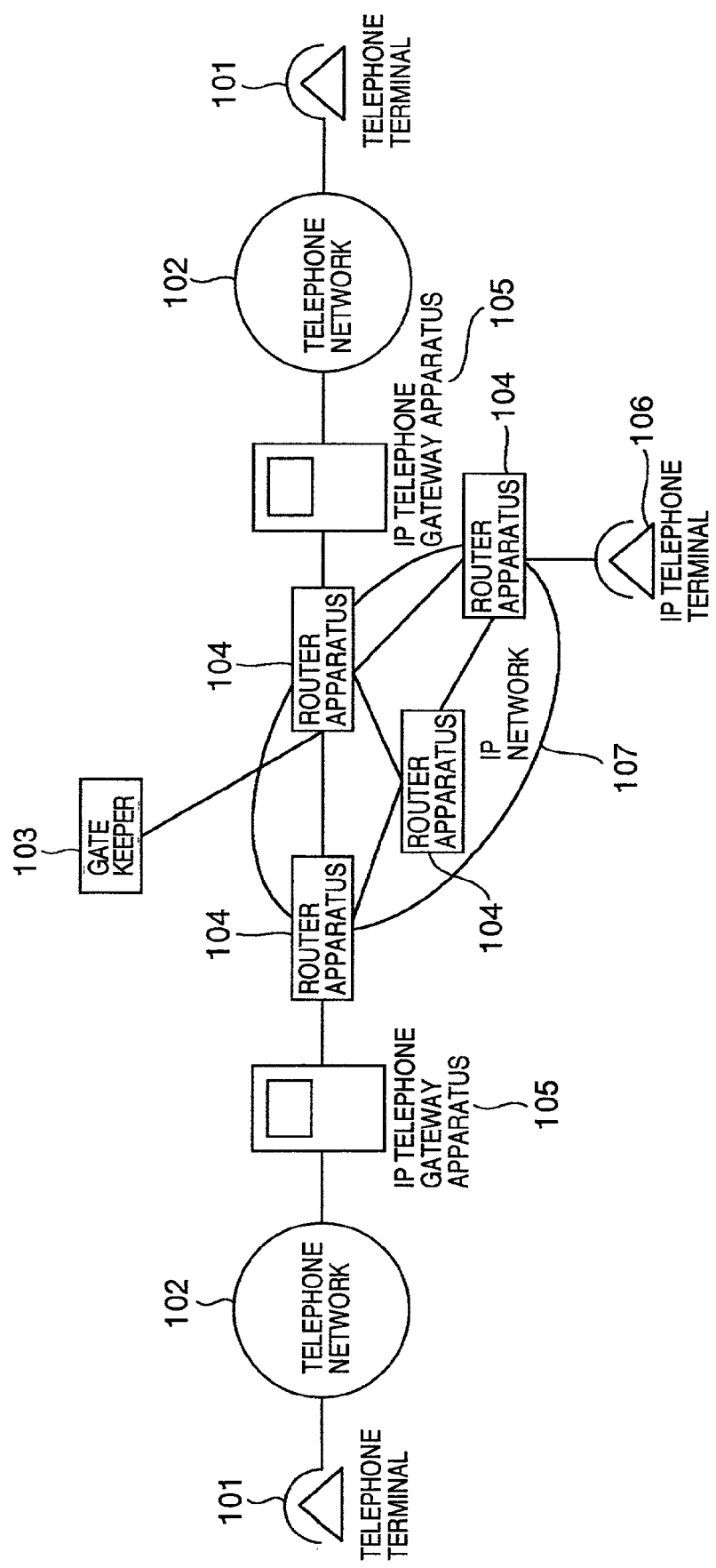
FIG. 1 is a schematic diagram showing construction of an IP telephone system.

FIG. 1 is a schematic diagram showing construction of an IP telephone system according to the present invention.

A telephone terminal 101 can be connected to a telephone network 102 and has the functions of at least on-hook, off-hook, ringing and reception of a telephone number input.

An IP telephone terminal 106 can be connected to an IP network 107 and makes a telephone call with a telephone terminal 101 through other IP telephone terminal or an IP telephone gateway apparatus 105. Also, the IP telephone terminal 106 has the functions of at least on-hook, off-hook, ringing and reception of a telephone number input.

The IP telephone gateway apparatus 105 is connected to both of the telephone network 102 and the IP network 107. The IP telephone gateway apparatus 105 conforms to ITU-T recommendation H. 323 and transfers a connection request and a request to terminate connection from the telephone terminal 101 connected to at least the telephone network 102 to either the IP telephone terminal 106 connected to the IP network 107 or other IP telephone gateway apparatus 105. In addition, the IP telephone gateway apparatus 105 transfers a connection request and a connection termination request from at least the IP telephone terminal 106 or other IP telephone gateway apparatus 105 to the telephone network 102. Further, the IP telephone gateway apparatus 105 relays a sound signal from the telephone network 102 in the form of a sound packet to the IP network 107 and then relays the sound packet from the IP network 107 in the form of a sound signal to the telephone network 102. In addition, when having received the above-mentioned connection request, the IP telephone gateway apparatus 105 makes inquiries about propriety of the connection and the report of the connection termination to the gate keeper apparatus 103 in accordance with the RAS (Registration, Admission and Status) conforming to ITU-T recommendation H. 225.0.

A gate keeper apparatus 103 is connected to the IP network 107, conforms to ITU-T recommendation H. 323, and presents the RAS procedure conforming to ITU-T recommendation H. 225.0. In addition, the gate keeper apparatus 103 makes inquiries about propriety of the connection from the IP telephone gateway apparatus 105 in accordance with the RAS procedure and executes the processing for reporting the connection termination. Also, the gate keeper apparatus 103 has the function of informing the router apparatus 104 of at least an address of the transmission source, an address of the transmission destination, a necessary communication band width, and the kind of request of security or release of a communication band using a protocol such as at least an RSVP or an SNMP, or a unique communication protocol.

The IP network 107 is constituted by router apparatuses 104 each of which can execute the processing for requesting security and release of a communication band width, and can secure and release the communication band width required for the communication between the IP telephone gateway apparatuses, between the IP telephone terminals or between the IP telephone gateway and the IP telephone terminal.

After having received, as notification, at least the address of the transmission source, the address of the transmission destination, the necessary communication band, and the kind of request of security and release of the communication band from the gate keeper apparatus 103 using the protocol such as at least the RSVP or the SNMP, or the unique communication protocol, the router apparatus 104 carries out the security and the release of the communication band in accordance with that information to send as a reply the result thereof.

The IP telephone gateway apparatus 105 and the gate keeper apparatus 103 may be physically the different apparatuses, or may be of an integral type in which both of the functions are accommodated in one chassis. Furthermore, the IP telephone gateway apparatus 105 and the gate keeper apparatus 103 may be the apparatuses each operating in conformity to RFC254 3 SIP (Session Initiation Protocol).

The outline of the processing executed by the IP telephone gateway apparatus 105 is as follows.

After having received the connection request from the telephone network, the IP gateway apparatus 105 makes inquiries about propriety of the connection using the address of the connection destination and the information of the necessary communication band to the gate keeper apparatus 103. When the reply from the gate keeper apparatus 103 is the connection permission, the IP telephone gateway apparatus 105 exchanges the information required for the processing for connecting a call with the IP telephone terminal of the connection destination or other IP telephone gateway apparatus in accordance with the IP telephone connection protocol. If the IP telephone gateway apparatus 105 succeeds in the processing for connecting a call, then the sound relay processing is started between the telephone network and the IP network. On the other hand, when the reply from the gate keeper apparatus 103 is the connection rejection, the IP telephone gateway apparatus 105 informs the telephone network of the connection rejection not to connect the line.

After having received the connection termination request from the telephone network, the IP telephone gateway apparatus 105 completes the connection to the telephone network and then exchanges the information required for the processing for terminating call connection with the IP telephone terminal in connection or other IP telephone gateway apparatus in accordance with the IP telephone connection protocol. Then, if the processing for terminating call connection has been completed, then the IP telephone gateway apparatus 105 completes the sound relay processing between the telephone network and the IP network. The IP telephone gateway apparatus 105 informs the gate keeper apparatus of the termination of call connection using the address of the connection destination and the information of the necessary communication band.

After having received the connection request from the IP network, the IP telephone gateway apparatus 105 exchanges the information required for the processing for connecting a call in accordance with the IP telephone connection protocol and if succeeding in the call connection processing, starts the sound relay between the telephone network and the IP network. On the other hand, if the call connection processing is rejected, then the IP telephone gateway apparatus 105 informs the IP telephone terminal or other IP telephone gateway apparatus of the connection rejection not to connect the line.

After having received the connection termination request from the IP network, the IP telephone gateway apparatus 105 exchanges the information required for the processing for terminating call connection with the IP telephone terminal in connection or other IP telephone gateway apparatus in accordance with the IP telephone connection protocol and after completion of the processing for terminating call connection, completes the sound relay processing between the telephone network and the IP network to inform the telephone network of termination of the connection. Then, the IP telephone gateway apparatus 105 informs the gate keeper apparatus of the connection termination using the address of the connection destination and the information of the necessary communication band.

The outline of the router apparatus 104 is as follows.

After having received a request to secure a band, the router apparatus 104 registers an address of a transmission source and an address of a transmission destination, which become the matching conditions when put into the queue for the priority relay processing, in a priority processing packet condition table. After having received a request to release a band, the router apparatus 104 deletes these addresses from that table. The router apparatus 104 has the function of comparing the address of the transmission source and the address of the transmission destination of a packet to be relaid with the contents of that table, and if the matching is obtained therebetween, adding those addresses to the queue for the priority relay processing, and otherwise, adding those addresses to the queue for the general relay processing.

(First Embodiment)

In the present embodiment, the description will hereinbelow be given with respect to a method wherein the gate keeper is adapted to request the security and the release of a band not every call, but collectively for each plurality of calls, and the security and the release of the necessary band are requested at frequency lower than that of origination or termination of a call.

The outline of the processing in the gate keeper apparatus 103 is as follows.

In receiving the connection request based on the RAS procedure, the gate keeper apparatus 103 retrieves a security situation managing table 602 for managing a communication band and a utilization band on the basis of the address of the transmission source and the address of the transmission destination which are specified by that request, and the information of the necessary communication band in order to obtain the communication band and the utilization band secured between the address of the transmission source and the address of the transmission destination at this time. Then, the gate keeper apparatus 103 compares the utilization band which is used by permitting newly the connection (new utilization band=utilization band+band for one call) with the security band as the retrieval result (it is decided as zero if there is no retrieval result). If the utilization band does not exceed the security band, then only the security situation managing table is updated.

On the other hand, if the utilization band exceeds the security band, then the gate keeper apparatus 103 requires the router apparatus to secure the security band wider than the security band at this time using the protocol such as at least the RSVP or the SNMP. If the gate keeper apparatus 103 succeeds in the request, then the value of the corresponding security communication band in the security situation managing table is updated.

On the other hand, if the gate keeper apparatus 103 fails in the request, then the contents of the communication state managing table are not updated. Or, a security request may be repeatedly retransmitted until the band can be secured. Then, the security request is retransmitted at least either at intervals of fixed period of time or at transmission intervals increased exponentially (e.g., at transmission intervals increased two times by two times). In addition, a upper limit may also be set in the number of times of retransmission. Also, for a period of time until the band can be secured, there is executed any one of the processing for rejecting the connection request when the utilization band exceeds the security band, or the processing for permitting the connection request knowing that there is the possibility that the communication quality may be degraded.

In receiving a connection termination notification based on the RAS procedure, the gate keeper apparatus 103 retrieves the security situation managing table on the basis of the information of the communication band secured between the address of the transmission source and the address of the transmission destination specified by that notification in order to obtain the communication band and the utilization band, which are secured between an address of the transmission source and an address of the transmission destination at this time. Then, a band for one call is subtracted from the utilization band.

FIG. 2 is a block diagram showing a hardware configuration of the gate keeper apparatus 103 in the present embodiment.

The gate keeper 103 presents the RAS procedure conforming to ITU-T recommendation H. 225.0. Then, the gate keeper apparatus 103 includes: an IP network interface 205 connected to the IP network 107; a program memory 206 for storing therein a program for an RAS procedure processing 208 conforming to the above-mentioned recommendation and a processing 207 for securing and releasing a communication band width; a buffer memory 201 for storing therein a transmission buffer 203 and a reception buffer 204 which are used to transmit and receive the data for the above-mentioned processings and the data to and from the IP network interface; a CPU 210 for executing the above-mentioned processings; and a control console 211 for controlling the start and the end of the above-mentioned processings and for manipulating a management table.

The IP network interface 205 is connected to the IP network 107, writes a reception packet received from the IP network into the reception buffer 204 and fetches a transmission packet from the transmission buffer 203 to transmit the transmission packet thus fetched, thereby transmitting/receiving the packet to/from the IP network.

The program memory 206 stores therein a program for realizing an RAS procedure processing 208 conforming to ITU-T recommendation H. 323 and ITU-T recommendation H. 225.0, and a processing 207 for securing and releasing a band.

The buffer memory 201 stores therein a reception buffer 204 for writing a packet received through the IP network interface 205, a transmission buffer 203 for writing the transmission packet, and a security situation managing table 602. By the way, in the present embodiment, no schedule managing table 202 is used.

FIG. 3 is a diagram showing table structure of the security situation managing table 602.

The security situation managing table 602 includes a column 701 of an address of one of both end points of communication, i.e., Endpoint1, a column 702 of an address of the other of both end points of communication, i.e., Endpoint2, a column 703 of a security band width, and a column 704 of a utilization band width. This table is prepared in order to manage a communication band width secured between the opposite end points Endpoint1 and Endpoint2 and a utilization band width in actual utilization obtained from the total number of calls in calling in pair.

A manager of the present system can carry out at least setting of a value in the table, cancellation of setting, and display of a value using the control console 611.

Figure 4:
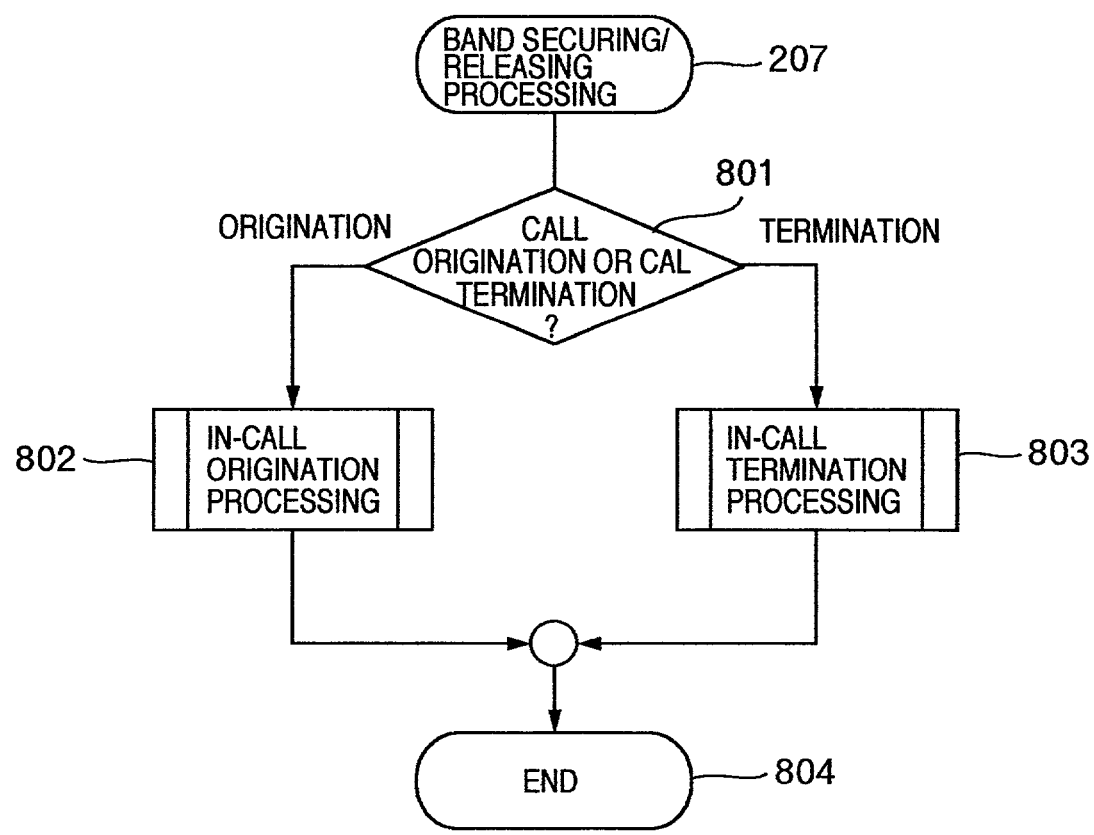
FIG. 4 is a flow chart useful in explaining the processing in a first embodiment of a band security/release processing 207.

As shown in FIG. 4, the processing 207 for securing and releasing a band is activated with the RAS message from the IP telephone gateway apparatus or the IP telephone terminal as a trigger to call an in-call origination processing in the case of call origination (Step 802), and to call an in-call termination processing in the case of call termination (Step 803).

Figure 5:
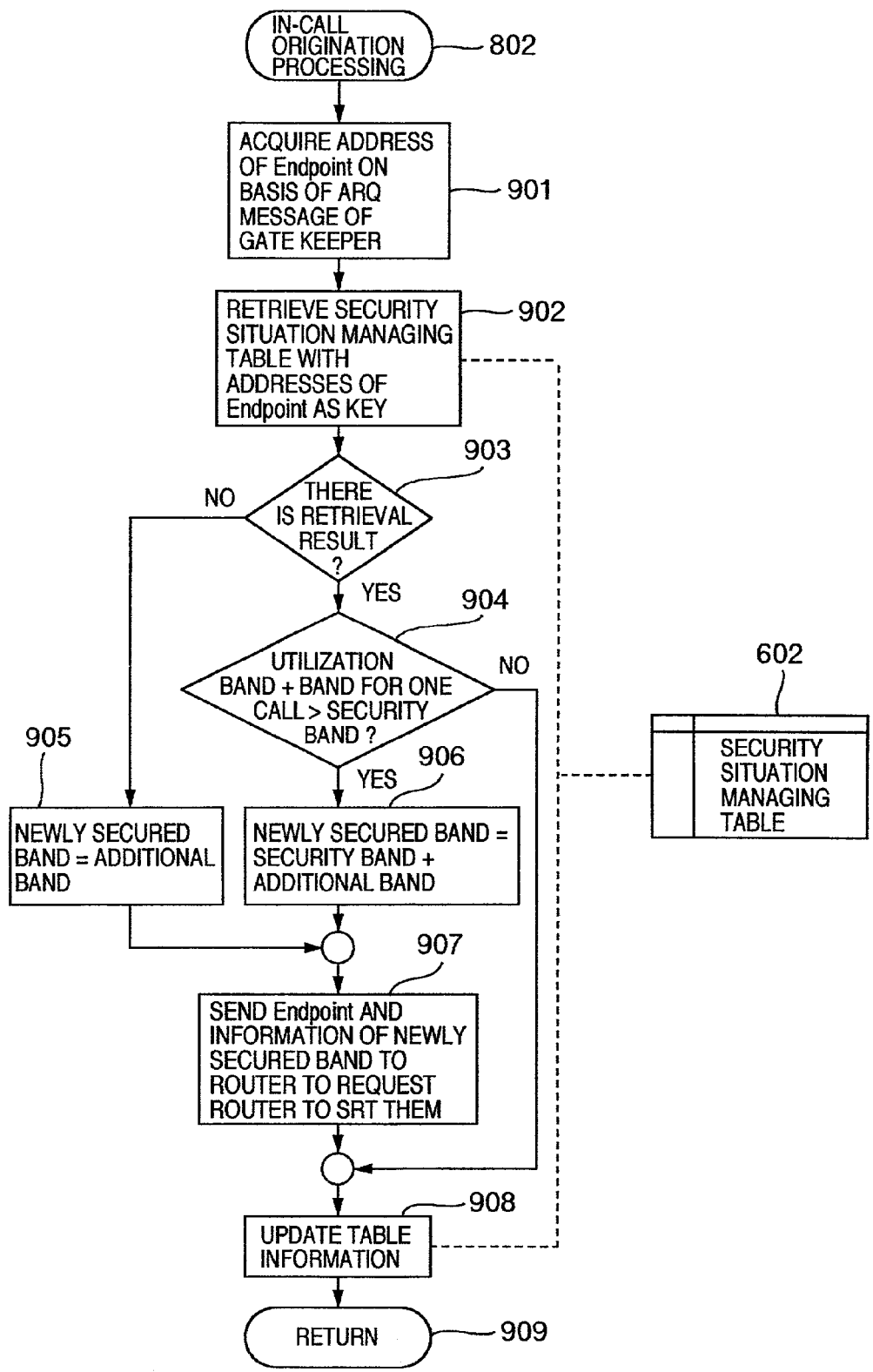
FIG. 5 is a flow chart useful in explaining the processing operation of an in-call origination processing.

As shown in FIG. 5, the in-call origination processing 802 is called from the processing 207 for securing and releasing a band in call origination to acquire address information of the both end points Endpoint1 and Endpoint2, at which communication is started, on the basis of the ARQ message which the gate keeper apparatus 103 has received from either the IP telephone gateway apparatus 105 or the IP telephone terminal 106 (Step 901) to retrieve the security situation managing table with that address as a key (Step 902).

If there is the retrieval result (Step 903), then it is checked whether or not a band width obtained by adding a band width required for one call to the current utilization band width is wider than the current security band width (Step 904).

If it is checked in Step 904 that the former is wider than the latter, a band width which is obtained by adding the additional band width (e.g., 1 Mbps) to the current security band width is made a new security band width (Step 906).

On the other hand, if it is checked in Step 904 that there is no retrieval result (Step 903), then a new band security width is regarded as new band security to be made an additional band width (e.g., 1 Mbps)(Step 905).

Addresses of the both end points Endpoint1 and Endpoint2 and information of the new security band width are transmitted to the router which can secure or release a band for the information of the security band width to request that router to set the communication band (Step 907).

That information is transmitted either using the protocol such as the RSVP, the SNMP or the COPS, or in the form of a unique message to that router.

If it is judged that a band width obtained by adding a band width required for one call to the current utilization band width is equal to or narrower than the current security band width (Step 904), then no request is transmitted to the router apparatus. Then, finally, the values of the corresponding columns in the security situation managing table are updated to the newest values (Step 908), and the process is returned back to the processing for securing and releasing a band (Step 909).

When the required band can not be secured in Step 907, the procedure may be adopted in which the additional band in Step 905 or Step 906 is cancelled and no update of the table information in Step 908 is carried out, or the securable maximum communication band is secured to carry out continuously the communication.

In addition to the above-mentioned processings, the security request may be repeatedly retransmitted until the band can be secured. The retransmission is carried out at least at intervals of fixed period of time, at transmission intervals increased exponentially (e.g., at transmission intervals increased two times by two times), or the like. Then, a upper limit may be set in the number of times of retransmission.

Figure 6:
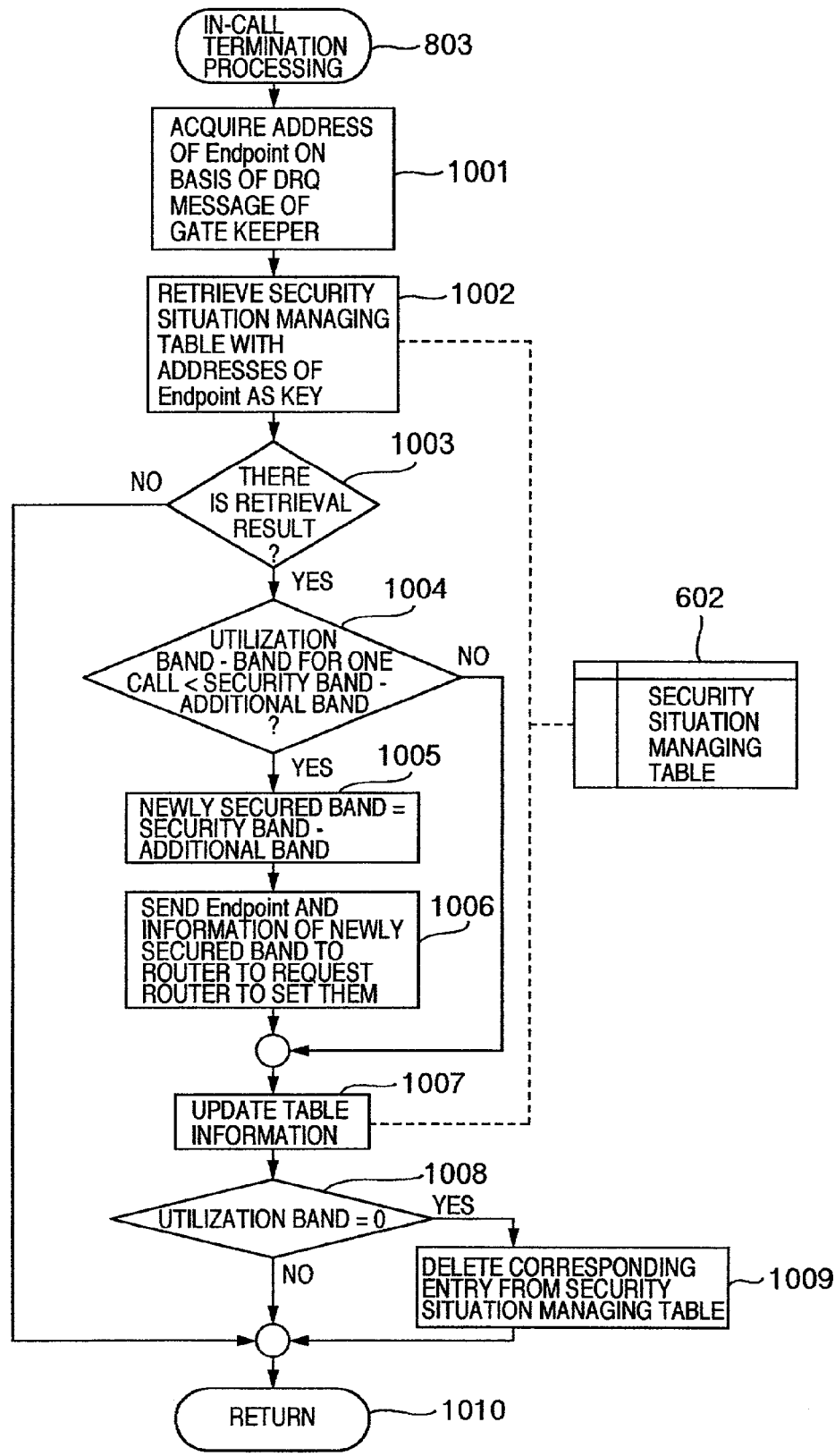
FIG. 6 is a flow chart useful in explaining the processing operation of an in-call termination processing.

As shown in FIG. 6, an in-call termination processing 803 is called from the processing 207 for securing and releasing a band in call termination to acquire address information of the both end points Endpoint1 and Endpoint2, at which communication is terminated, on the basis of a DRQ message which the gate keeper apparatus 103 has received from the IP telephone gateway apparatus 105 or the IP telephone terminal 106 (Step 1001) to retrieve the security situation managing table with these addresses as a key (Step 1002).

If there is the retrieval result (Step 1003), then it is checked whether or not a band width obtained by subtracting a band width required for one call from the current utilization band width is narrower than a band width obtained by subtracting an additional band width (e.g., 1 Mbps) from the current security band width (Step 1004).

If it is checked in Step 1004 that the former is narrower than the latter, then a band width, which is obtained by subtracting the additional band width (e.g., 1 Mbps) from the current security band width, is made a new security band width (Step 1005).

Addresses of the both end points Endpoint1 and Endpoint2 and the information of the new security band width are transmitted to the router apparatus which can secure or release a band for the information of the security band width to request that router to set the communication band (Step 1006).

The information may be transmitted to that router apparatus either using the protocol such as the RSVP, the SNMP or the COPS, or in the form of the unique message. On the other hand, if it is checked that the latter is equal to or narrower than the former (Step 1004), then no request is transmitted to the router apparatus. Next, the values of the corresponding columns in the security situation managing table are updated to the newest values (Step 1007).

If the current utilization band width is zero (i.e., there is no communication between the both end points) (Step 1008), then an entry of the corresponding column is deleted from the security situation managing table (Step 1009).

Next, the process is returned back to the processing for securing or releasing a band.

If there is no retrieval result, then nothing is done and the process is returned back to the processing for securing or releasing a band (Step 1003).

Figure 7:
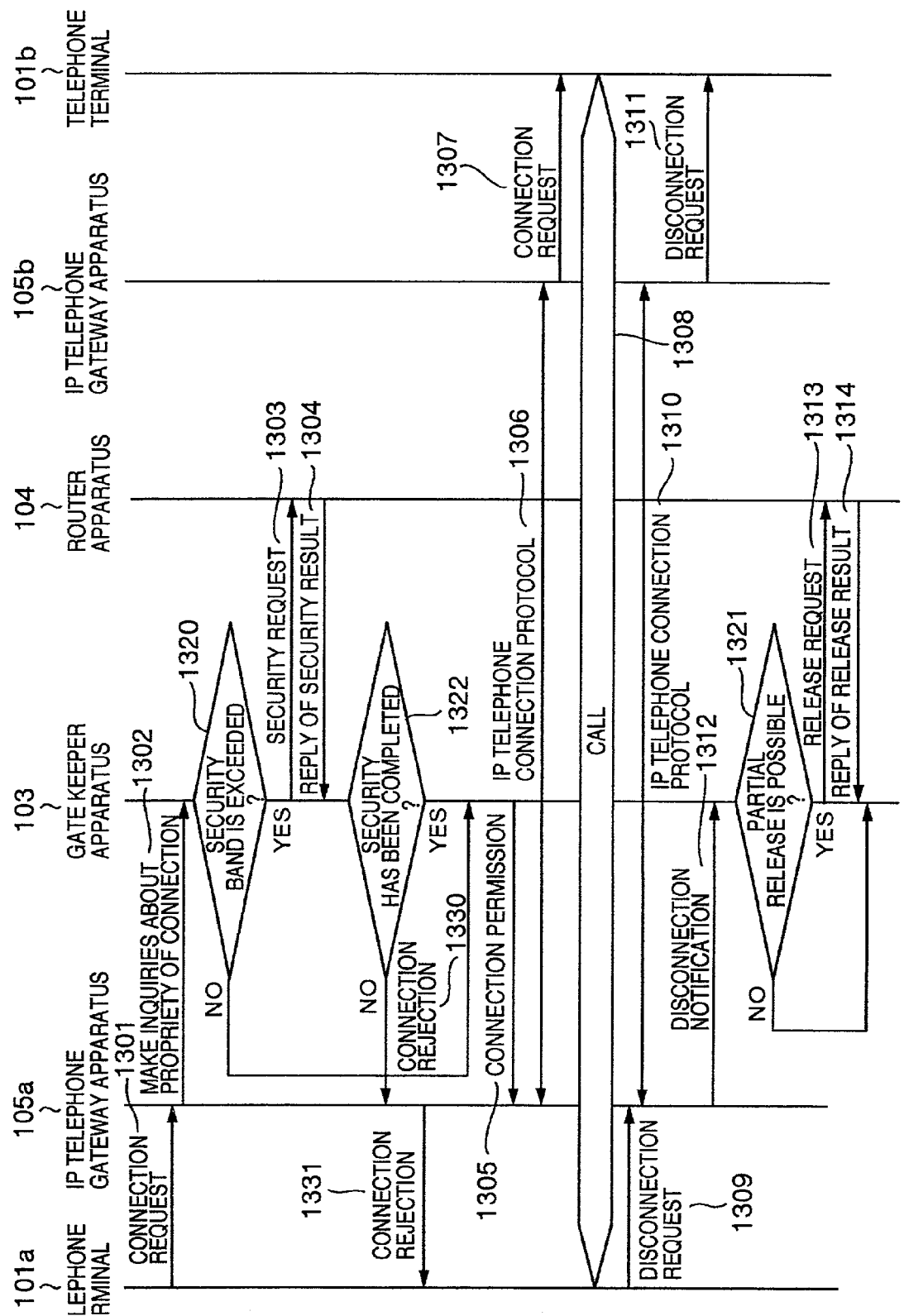
FIG. 7 is a flow chart useful in explaining a communication sequence in the first embodiment.

FIG. 7 shows a communication sequence.

When a connection request has been made from the telephone terminal 101a to the IP telephone gateway apparatus 105a (Step 1301), the IP telephone gateway apparatus 105 makes inquiries about propriety of the connection for the gate keeper apparatus 103 (Step 1302).

The gate keeper apparatus 103 which has received the request judges whether or not the communication band which is already secured by the new connection is exceeded (Step 1230).

If it is judged in Step 1230 that the communication band which is already secured by the new connection is not exceeded, then nothing is done. On the other hand, if it is judged in Step 1230 that the communication band which is already secured by the new connection is exceeded, then the gate keeper apparatus 103 requests the router apparatus 104 to secure a band width which is obtained by adding an additional band width to the current communication band (Step 1303), and the router apparatus 104 informs the gate keeper apparatus 103 of whether or not the band required by a reply of the security result has been able to be secured (Step 1304).

If the band required by a reply of the security result has been able to be secured (Step 1322), then the gate keeper apparatus 103 sends as a reply a connection permission to the IP telephone gateway apparatus 105a.

After the connection has been permitted, the IP telephone gateway apparatus 105a exchanges the information required for the connection with the IP telephone gateway apparatus 105b opposite thereto in accordance with the IP telephone connection protocol (e.g., ITU-T recommendation H. 323 or the like).

The IP telephone gateway apparatus 105b makes a request of connection to the telephone terminal 101b to the telephone network (Step 1307).

On the other hand, if the band required by a reply of the security result has been unable to be secured in Step 1322, then the gate keeper apparatus 103 sends as a reply a connection rejection to the IP telephone gateway apparatus 105a, and the IP telephone gateway apparatus 105a informs the telephone terminal 101a of the connection rejection (Step 1331).

If the band required by a reply of the security result has been unable to be secured in Step 1322, then the security request may be repeatedly retransmitted until the band can be secured. The retransmission is carried out at intervals of fixed period of time, at intervals increased exponentially (e.g., at intervals increased two times by two times), or the like. A upper limit may be set in the number of times of retransmission. In addition, there may be executed the processing wherein the connection is permitted if the possibility that the call quality may be degraded is accepted.

After a call has been terminated and the connection termination request is made from the telephone terminal 101a to the IP telephone gateway apparatus 105a (Step 1309), the IP telephone gateway apparatus 105a exchanges the information required for the connection termination with the IP telephone gateway apparatus 105b opposite thereto in accordance with the IP telephone connection protocol (Step 1310).

The IP telephone gateway apparatus 105b makes a request of termination of the connection to the telephone terminal 101b to the telephone network (Step 1311).

On the other hand, the IP telephone gateway apparatus 105a informs the gate keeper apparatus 103 of termination of the connection (Step 1312).

The gate keeper apparatus 103 which has received that notification judges whether or not a part of the communication band, which has already been secured after termination of the connection, can be released (Step 1321).

If it is judged in Step 1321 that a part of the communication band, which has already been secured after termination of the connection, can not be released, then nothing is done. On the other hand, if it is judged in Step 1321 that a part of the communication band, which has already been secured after termination of the connection, can be released, then the gate keeper apparatus 103 requests the router apparatus 104 to secure the band width which is obtained by subtracting an additional band width from the current communication band (Step 1313).

Figures 8, 9:
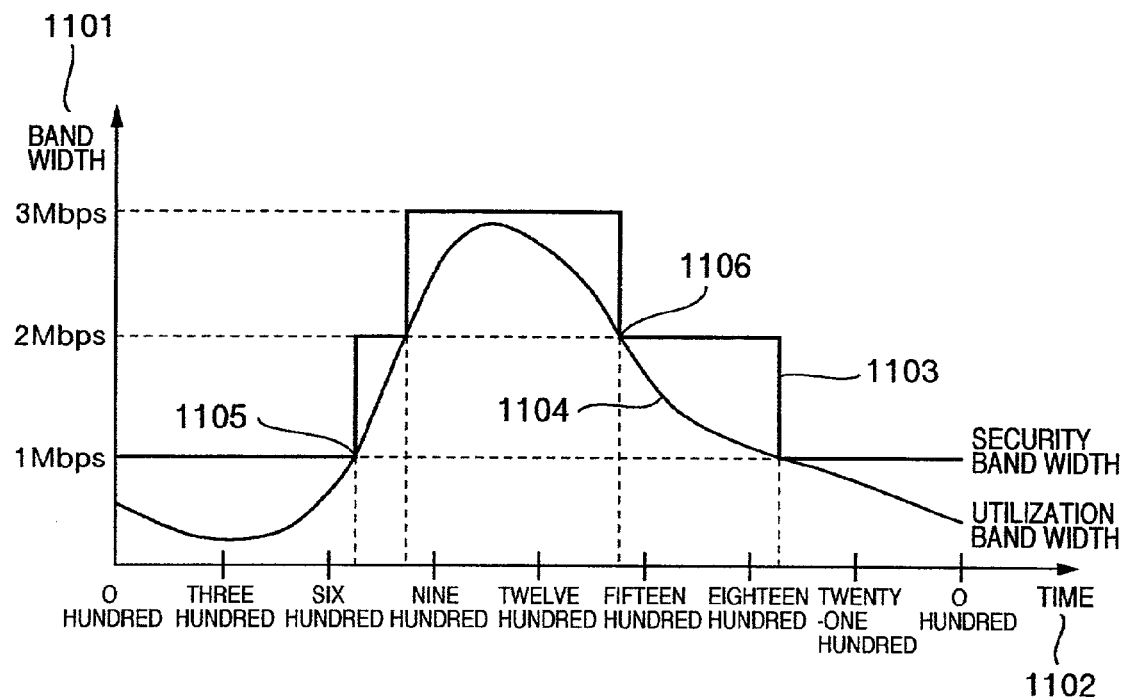
FIG. 8 is a diagram showing a time change in security band width according to the processing of the first embodiment.
FIG. 9 is a diagram showing table structure of a schedule managing table 202.

FIG. 8 is a graphical representation useful in explaining a change in time of a security band width according to the present embodiment. In the figure, the axis 1101 of ordinate represents a band width, and the axis 1102 of abscissa represents a time. A time change 1103 in security band width shows an example in which for a time change 1104 in the actual utilization band width, the processing for securing and releasing a band in FIG. 4, the in-call origination processing in FIG. 5, and the in-call termination processing in FIG. 6 are executed. At a time point 1105, since the necessary band width exceeds the security band width, only an additional band width (1 Mbps in this case) is added to the band width by executing the in-call origination processing. At a time point 1106, since the necessary band width becomes narrower than the band width which is obtained by subtracting an additional band width (1 Mbps) from the security band width, only the additional band width is subtracted from the band width by executing the in-call termination processing.

The gate keeper apparatus 103 may be the apparatus different from the IP telephone gateway apparatus 105 or may be integrated with the IP telephone gateway apparatus 105.

According to the present embodiment, the router apparatus is requested to secure or release a communication band collectively for a plurality of calls of the band used in the communication, whereby the frequency of generation of the requests becomes less than that of generation of the origination and the termination of a call. As a result, it is possible to reduce the band which is used in the processing for securing or releasing a communication band, and also the following becomes possible even when a time required for the processing for securing or the releasing a communication band in the router apparatus is long.

(Second Embodiment)

In the present embodiment, the description will hereinbelow be given with respect to a method wherein an estimated value of a time series change in necessary band is previously set in the gate keeper apparatus, and the security or the release of a band required for the communication is required depending on a time, but independently of origination or termination of a call.

The outline of the processing in the gate keeper apparatus 103 is as follows.

In receiving a connection request based on the RAS procedure, the gate keeper apparatus 103 retrieves the security situation managing table 602 for managing a communication band and a utilization band on the basis of the address of the transmission source and the address of the transmission destination which are specified by that request in order to obtain the communication band and the utilization band which are secured between an address of the transmission source and an address of the transmission destination at this time point. Then, the gate keeper apparatus 103 compares the utilization band used by permitting newly the connection (new utilization band=utilization band+band for one call) with the security band corresponding to the retrieval result (it is decided as zero if there is no retrieval result).

If it is judged that the utilization band exceeds the security band, at least any one of the processing for rejecting the connection request when the utilization band exceeds the security band or the processing for permitting the connection knowing that there is the possibility that the call quality may be degraded.

In receiving the notification of termination of the connection based on the RAS procedure, the gate keeper apparatus 103 retrieves the security situation managing table for managing a communication band and a utilization band on the basis of the information of the communication band which is secured between the address of the transmission source and the address of the transmission destination which are specified by that notification in order to obtain the communication band and the utilization band which are secured between an address of the transmission source and an address of the transmission destination at this time point. Then, a band for one call is subtracted from the utilization band.

In addition, the gate keeper apparatus 103 requests the router apparatus to secure or release the communication band secured for a call in parallel with the above-mentioned two processings on the basis of the information in the schedule managing table using the protocol such as at least the RSVP or the SNMP. When the gate keeper apparatus 103 succeeds in that request, the value of the corresponding security communication band in the security situation managing table is updated.

On the other hand, when the gate keeper apparatus 103 fails in that request, the contents of the security situation managing table are not updated. Or, the security request may be repeatedly retransmitted until the band can be secured. Then, the security request is retransmitted either at intervals of fixed period of time, or at transmission intervals increased exponentially (e.g., at retransmission intervals increased two times by two times). In addition, a upper limit may be set in the number of times of retransmission.

The gate keeper apparatus 103 in the present embodiment has the hardware configuration which is nearly the same as that of the gate keeper apparatus 103 in the first embodiment. However, a point of difference is that the schedule managing table 202 is used instead of the security situation managing table 602 and also the processing 207 for securing or releasing a band is different from that in the first embodiment.

FIG. 9 is a diagram showing table structure of the schedule managing table 202. The schedule managing table 202 includes a column 301 of a specified time, a column 302 of an address of one of the both end points of the communication, i.e., Endpoint1, a column 303 of an address of the other of the both end points of the communication, i.e., Endpoint2, and a column 304 of a security band width, and manages the both end points Endpoint1 and Endpoint2 of the communication, at which the corresponding specified time and the communication band width are secured, and the security band width in pair. This table can carry out at least the setting of a value in the table, the cancellation of the setting, and the display of a value using the control console 211.

Figure 10:
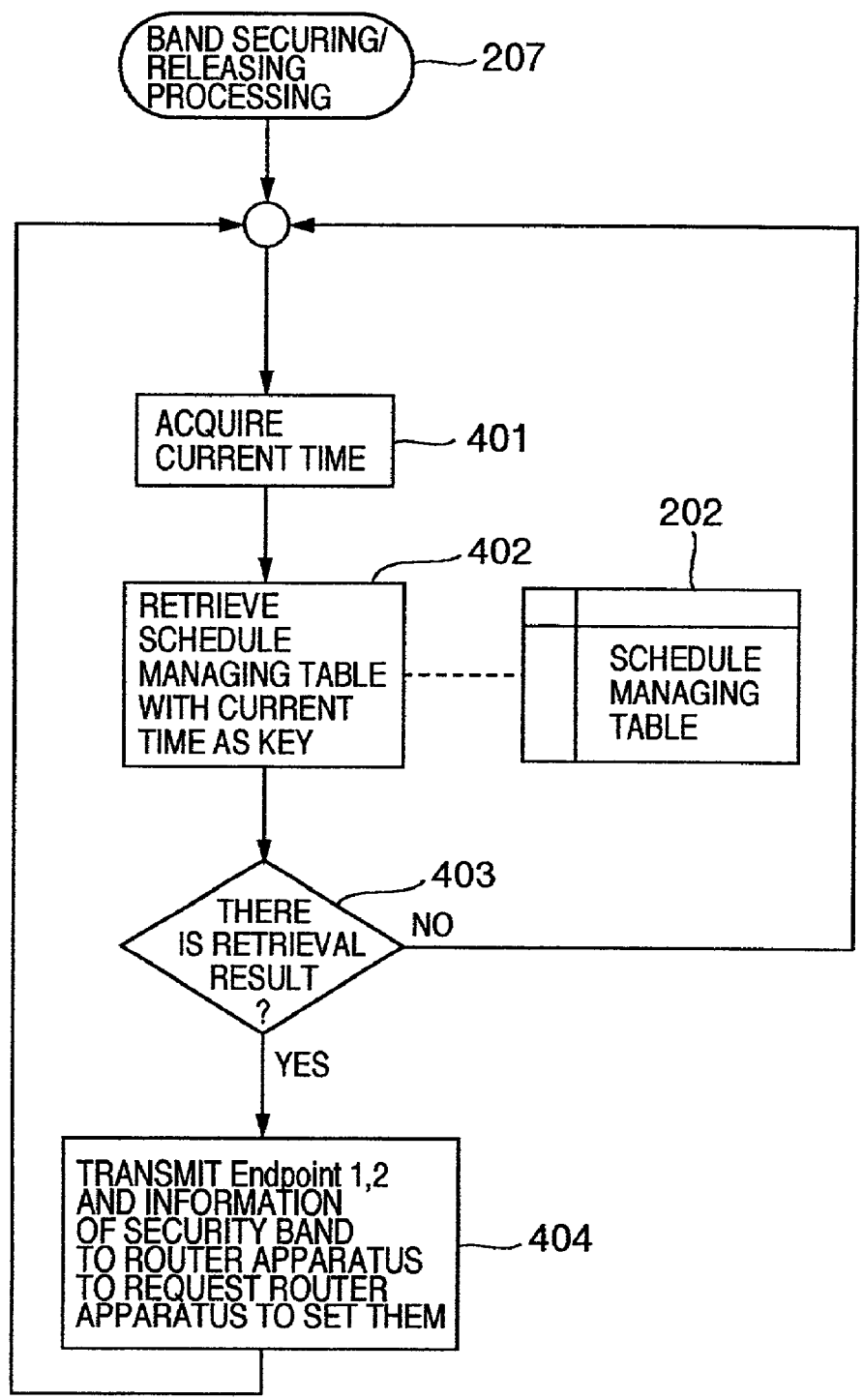
FIG. 10 is a flow chart useful in explaining the processing in a second embodiment of a band security/release processing 207.

FIG. 10 is a flow chart useful in explaining the flow of the processing 207 for securing or releasing a band in the present embodiment. The processing 207 for securing or releasing a band acquires periodically (e.g., at intervals of one minute) a current time (Step 401) to retrieve the schedule managing table 202 with the acquired time as a key (Step 402).

If there is no retrieval result, then the process is returned back to the start point. On the other hand, if there is the retrieval result, then the both end points Endpoint1 and Endpoint2 as the retrieval result, and the information of the security band width are transmitted to the router apparatus which can secure or release a band to request this router apparatus to set the communication band (Step 404).

Then, the information is transmitted to the router apparatus either using a protocol such as the RSVP, the SNMP or the COPS, or in the form of a unique message.

When the required band can not be secured in Step 404, there is executed any one of at least the processing for carrying out continuously the communication in the communication band which is already secured, or the processing for carrying out continuously the communication after having secured the maximum communication band which is narrower than the required band and is securable.

In addition to the above-mentioned processing, the request to secure a band may be repeatedly retransmitted until the band can be secured. The retransmission is carried out at least at intervals of fixed period of time, at intervals increased exponentially (e.g., at intervals increased two times by two times), or the like. A upper limit may be set in the number of times of retransmission.

Figure 11:
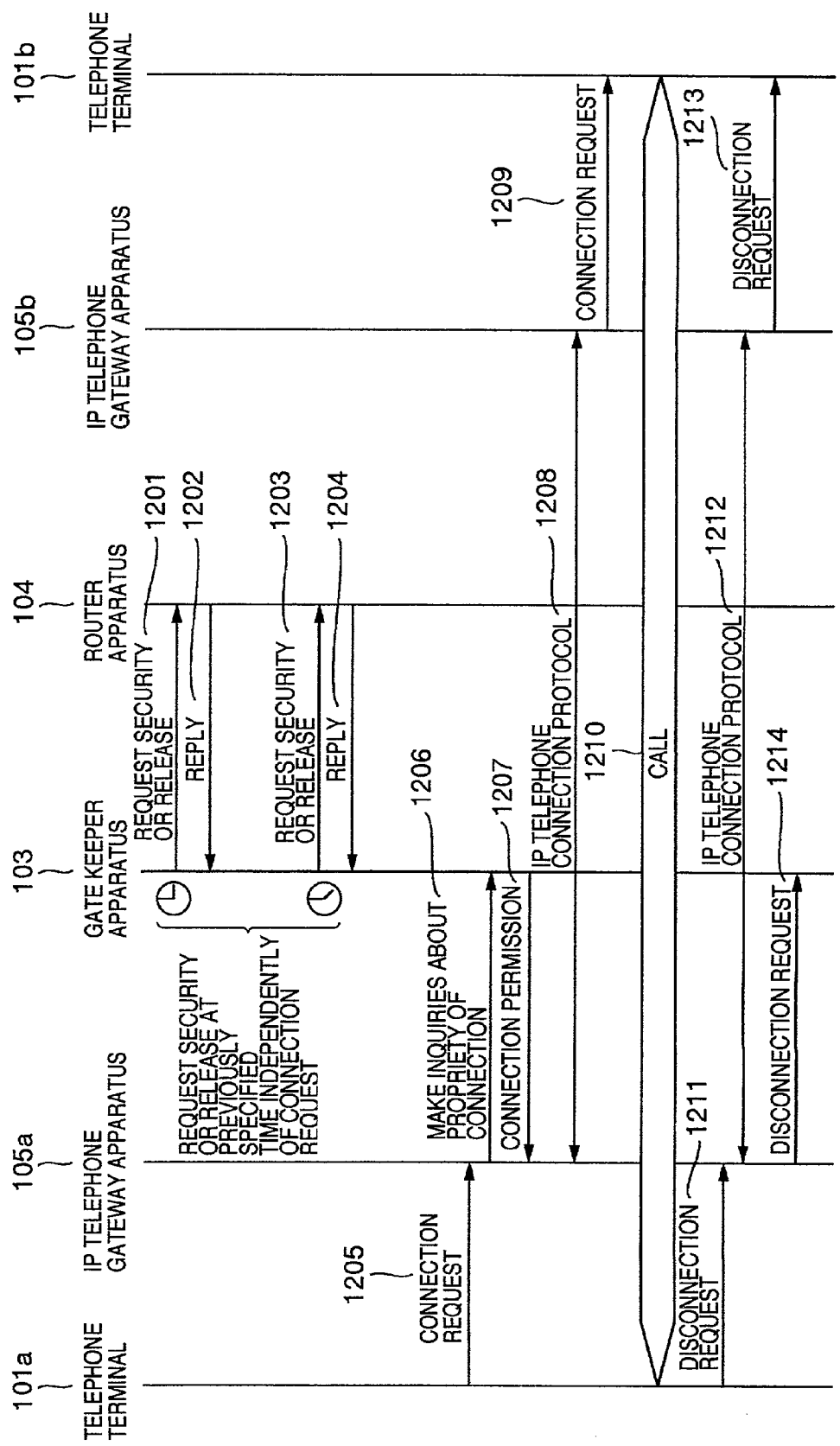
FIG. 11 is a flow chart useful in explaining communication sequence in the second embodiment.

FIG. 11 shows a communication sequence.

The gate keeper apparatus 103 requests the router apparatus 104 to secure or release a communication band at a previously specified time independently of the connection request or the connection termination notification from the IP telephone gateway apparatus 105 (Steps 1201 to 1204).

When a connection request has been made from the telephone terminal 101a to the IP telephone gateway apparatus 105a (Step 1205), the IP telephone gateway apparatus 105a makes inquiries about propriety of the connection to the gate keeper apparatus 103 (Step 1206).

Then, the gate keeper apparatus 103 judges whether or not the communication band which is already secured by new connection is exceeded. When there is no problem even if the connection is carried out, the gate keeper apparatus 103 sends as a reply the permission of the connection (Step 1207).

If the connection is permitted, then the IP telephone gateway apparatus 105a exchanges the information required for the connection with the IP telephone gateway apparatus 105b opposite thereto in accordance with the IP telephone connection protocol (e.g., ITU-T recommendation H. 323) or the like (Step 1208).

Then, the IP telephone gateway apparatus 105b makes a connection request for the telephone terminal 101b to the telephone network (Step 1209).

After a connection termination request has been made from the telephone terminal 101a to the IP telephone gateway apparatus 105a (Step 1211), the IP telephone gateway apparatus 105a exchanges the information required for termination of the connection with the IP telephone gateway apparatus 105b opposite thereto in accordance with the IP telephone connection protocol (Step 1212).

The IP telephone gateway apparatus 105b makes a request to terminate the connection for the telephone terminal 101b to the telephone network (Step 1213).

On the other hand, the IP telephone gateway apparatus 105a informs the gate keeper apparatus 103 of termination of the connection (Step 1214).

FIG. 12 is a graphical representation useful in explaining an example of a time change in security band width according to the present embodiment. In the figure, the axis of ordinate represents a band width and the axis of abscissa represents a time. A time change 503 in security band width shows an example in which the processing for securing or releasing a band in FIG. 10 is executed in accordance with the set value of the schedule managing table.

When having received the connection requests the number of which exceeds the security communication band from the IP telephone gateway apparatus, the gate keeper apparatus 103 executes any one of at least the processing for rejecting the connection for the exceeding connection requests, or the processing for permitting the connection knowing that there is the possibility that the communication quality may be degraded.

The gate keeper apparatus 103 may be separated from the IP telephone gateway apparatus 105, or may be integrated with the IP telephone gateway apparatus 105.

According to the present embodiment, since the router apparatus is requested to set the security or the release of the band width required for a communication depending on a time, but independently of the event of origination and termination of a call, it is possible to reduce remarkably the frequency of generation of requests. As a result, it is possible to reduce the band which is used in the processing for securing or releasing a communication band, and also the following becomes possible even if a period of time required for the processing for securing or releasing a communication band in the router apparatus is long.

As set forth hereinabove, according to the present invention, since it is possible to reduce a band required for the processing for securing or releasing a communication band, it is possible to increase the whole band which can be used in a sound communication. In addition, it is also possible to reduce the processings in a router apparatus. As a result, it is possible to prevent the communication quality from being degraded.

It should be further understood by those skilled in the art that the foregoing description has been made on embodiments of the invention and that various changes and modifications may be made in the invention without departing from the spirit of the invention and the scope of the appended claims.

What is claimed is:

1. A communication band securing method for use in an IP telephone network including a plurality of router apparatuses each of which can secure a band width used in communication between terminals and can release a used band width, an IP network comprising said plurality of router apparatuses, one or more telephone networks having telephone terminals connected thereto, a gate keeper apparatus connected to said IP network, one or more IP telephone gateway apparatuses through which said IP network and said telephone networks are connected to each other, and one or more IP telephone terminals connected to said IP network, said method comprising the steps of:

said gate keeper apparatus obtaining the call terminating side IP telephone gateway apparatus or the call terminating side IP telephone terminal corresponding to a call terminating side telephone number accompanying a communication request received from the call originating side IP telephone gateway apparatus or the call originating side IP telephone terminal, and when a communication band width secured on a communication path between the call originating IP telephone gateway apparatus and the call terminating side IP telephone gateway apparatus or between said IP telephone terminals is narrower than the total communication band width after establishment of the connection based on the communication request, said gate keeper apparatus requesting the associated one(s) of said router apparatuses disposed on the communication path to secure additionally a band in the previously specified additional band width wider than the communication band width required for the communication to inform the call originating side IP telephone gateway apparatus or the call originating side IP telephone terminal, and the call terminating side IP telephone gateway apparatus or the call terminating side IP telephone terminal of a result of the request.

2. A communication band securing method according to claim 1, further comprising the step of:

when the requested band is secured, carrying out the requested communication between the call originating side IP telephone gateway or the call originating side IP telephone terminal and the call terminating side IP telephone gateway or the call terminating side IP telephone terminal.

3. A communication band securing method according to claim 1, further comprising the step of:

when the required band can not be secured, said gate keeper apparatus permitting the connection if the call originating side IP telephone gateway apparatus or the call originating side IP telephone terminal accepts the possibility that the communication request may be degraded.

4. A communication band securing method according to claim 1, further comprising the step of:

when the communication is terminated between said IP telephone gateway apparatuses, between said IP telephone terminals connected to said IP network, or between the associated one of said IP telephone terminals and the associated one of said IP telephone gateway apparatuses, if the previously secured communication band width on a communication path between the call originating side IP telephone gateway apparatus and the call terminating side IP telephone gateway apparatus, or between said IP telephone terminals is wider than the total communication band width after completion of the connection, and a difference between the previously secured communication band width and the total communication band width is larger than the previously specified value, then said gate keeper apparatus releasing the band in the previously specified band width to the associated one(s) of said router apparatuses disposed on the communication path.

5. A communication band securing method for use in an IP telephone network including a plurality of router apparatuses each of which can secure a band width used in communication between terminals and can release a used band width, an IP network constituted by said plurality of router apparatuses, one or more telephone networks having telephone terminals connected thereto, a gate keeper apparatus connected to said IP network, one or more IP telephone gateway apparatuses through which said IP network and said telephone networks are connected to each other, and one or more IP telephone terminals connected to said IP network, said method comprising the steps of:

said gate keeper apparatus obtaining the call terminating side IP telephone gateway apparatus or the call terminating side IP telephone terminal corresponding to a call terminating side telephone number accompanying a communication request received from the call originating side IP telephone gateway apparatus or the call originating side IP telephone terminal, and when a communication band width secured on a communication path between the call originating side IP telephone gateway apparatus and the call terminating side IP telephone gateway apparatus or between said IP telephone terminals is narrower than the total communication band width after establishment of the connection based on the communication request, said gate keeper apparatus requesting the associated one(s) of said router apparatuses disposed on a communication path between said IP telephone gateway apparatuses, between said IP telephone terminals, or between the associated one of said IP telephone terminals and the associated one of said IP telephone gateway apparatuses to secure and release a band in accordance with the previously specified time schedule.

6. A communication band securing method according to claim 5, further comprising the step of:

when the required band can not be secured, said gate keeper apparatus securing a securable maximum communication band.

7. A communication band securing method according to claim 6, further comprising the step of:

when the required band can not be secured, said gate keeper apparatus permitting the connection if the call originating side IP telephone gateway apparatus or the call originating side IP telephone terminal accepts the possibility that the communication quality may be degraded.

8. A communication band securing method according to claim 5, further comprising the step of:

when the required band can not be secured, said gate keeper apparatus permitting the connection if the call originating side IP telephone gateway apparatus or the call originating side IP telephone terminal accepts the possibility that the communication quality may be degraded.

9. A communication band securing method according to claim 5, further comprising the step of:

when the required band can not be secured, said gate keeper apparatus repeats the security request until the requested band can be secured.

* * * * *